United States Patent [19]

Rothman et al.

[11] Patent Number: 5,772,883
[45] Date of Patent: Jun. 30, 1998

[54] SLANTED INLINE FILTER

[75] Inventors: Jim C. Rothman, Burnsville; Gary R. Gillingham, Prior Lake; Wayne M. Wagner; Joseph C. Tokar, both of Apple Valley; Daniel T. Risch, Burnsville; Fred H. Wahlquist, Bloomington; Bernard A. Matthys, Apple Valley, all of Minn.

[73] Assignee: Donaldson Company, Inc., Minneapolis, Minn.

[21] Appl. No.: 638,453

[22] Filed: Apr. 26, 1996

[51] Int. Cl.$^6$ .................................................. B01D 25/02
[52] U.S. Cl. ........................ 210/487; 210/488; 210/493.1; 210/493.3; 210/494.1; 210/521; 55/500; 55/521; 55/DIG. 12
[58] Field of Search .............................. 210/493.1, 493.3, 210/494.1, 487, 488, 433.1, 521; 55/500, 521, DIG. 12

[56] References Cited

U.S. PATENT DOCUMENTS

| | | |
|---|---|---|
| 1,729,135 | 9/1929 | Slauson . |
| 2,019,186 | 10/1935 | Kaiser . |
| 2,038,071 | 4/1936 | Wilhelm . |
| 3,020,977 | 2/1962 | Huppke et al. . |
| 3,025,963 | 3/1962 | Bauer . |
| 3,025,964 | 3/1962 | Summers et al. . |
| 3,112,184 | 11/1963 | Hollenbach . |
| 3,112,262 | 11/1963 | Parkinson . |
| 3,372,533 | 3/1968 | Rummel . |
| 3,392,839 | 7/1968 | Mills . |
| 3,469,705 | 9/1969 | Thomas . |
| 3,815,754 | 6/1974 | Rosenberg . |
| 4,166,792 | 9/1979 | Offer et al. . |
| 4,376,053 | 3/1983 | Bullock et al. . |
| 4,410,427 | 10/1983 | Wydeven . |
| 4,430,223 | 2/1984 | Miyakawa et al. . |
| 4,439,321 | 3/1984 | Taki et al. . |
| 4,460,388 | 7/1984 | Fukami et al. . |
| 4,589,983 | 5/1986 | Wydevan . |
| 4,652,286 | 3/1987 | Kusuda et al. . |
| 4,678,589 | 7/1987 | Ayres, Jr. . |
| 4,704,863 | 11/1987 | Abthoff et al. . |
| 4,728,426 | 3/1988 | Rudinger et al. . |
| 4,867,879 | 9/1989 | Muller . |
| 4,925,561 | 5/1990 | Ishii et al. . |
| 5,322,537 | 6/1994 | Nakamura et al. . |
| 5,494,497 | 2/1996 | Lee . |
| 5,512,075 | 4/1996 | Ninomiya et al. . |

FOREIGN PATENT DOCUMENTS

| | | |
|---|---|---|
| 671 096 | 2/1939 | Germany . |
| 1407868 | 12/1977 | Germany ........................ 55/DIG. 12 |
| 2 155 355A | 9/1985 | United Kingdom . |
| 2 169 522 A | 7/1986 | United Kingdom . |
| WO 83/01582 | 5/1983 | WIPO . |
| WO 88/03431 | 5/1988 | WIPO . |

*Primary Examiner*—W. L. Walker
*Attorney, Agent, or Firm*—Merchant, Gould, Smith, Edell, Welter & Schmidt

[57] ABSTRACT

A filter device inserts into a duct having flow passing from upstream to downstream. The filter device includes fluted filter media having flutes formed therein inserting into a housing. The filter media is stacked and placed at an angle to the prevailing flow direction.

30 Claims, 10 Drawing Sheets

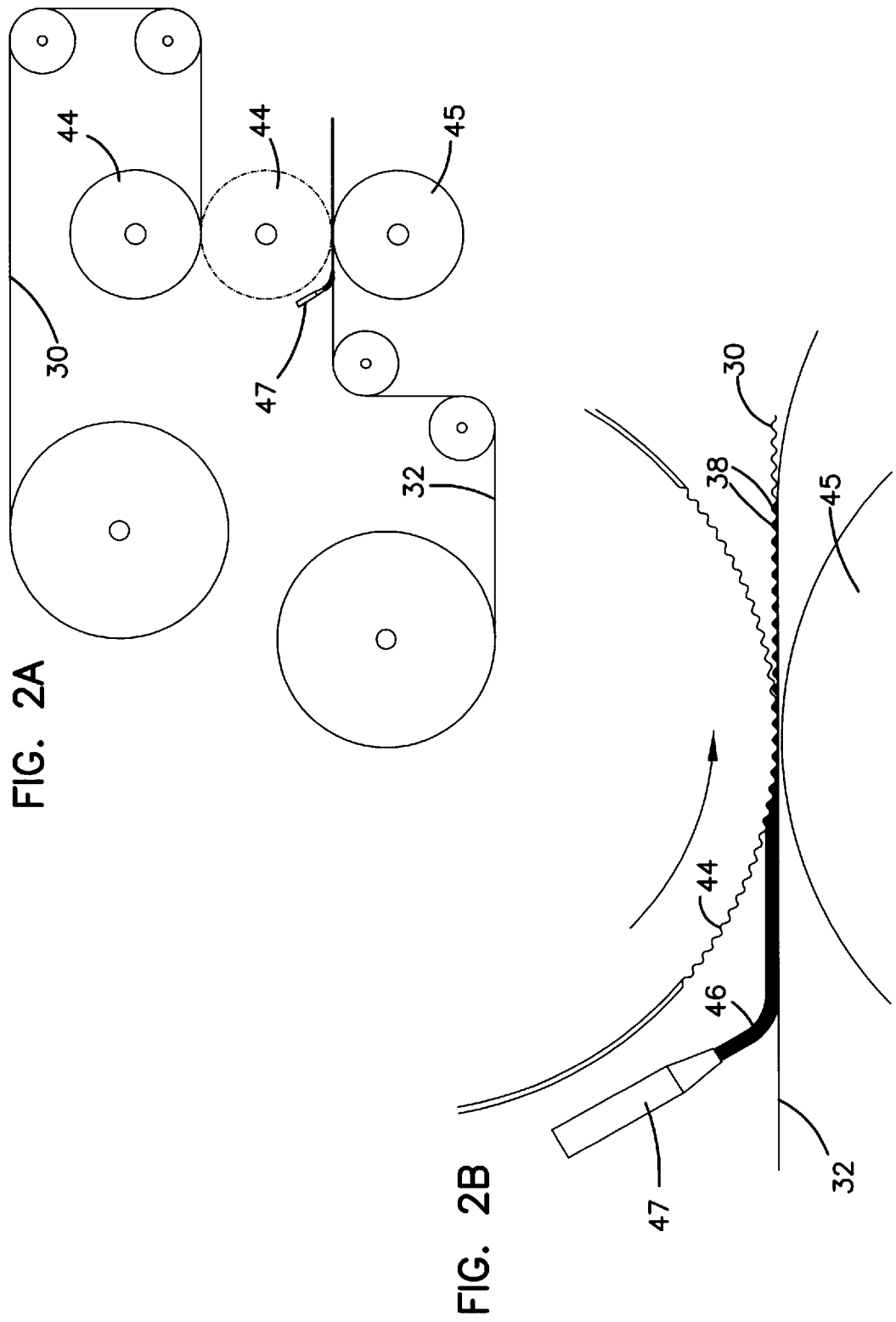

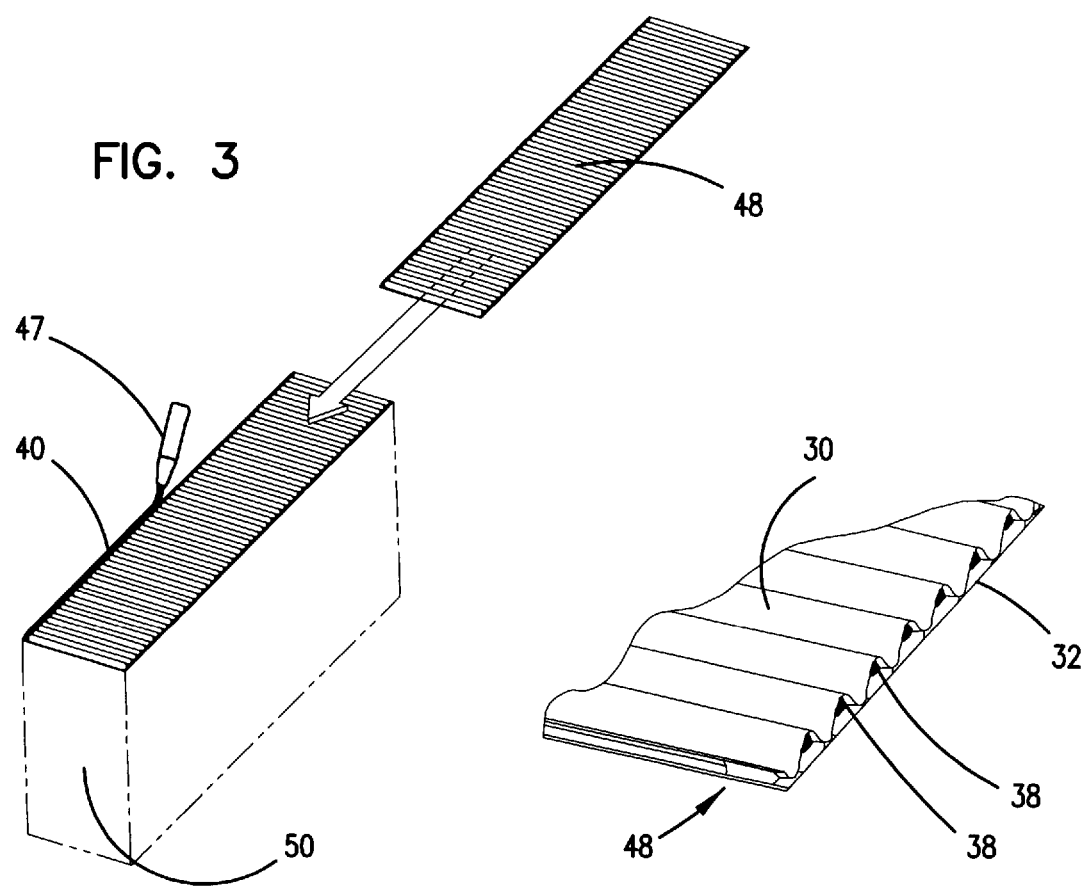

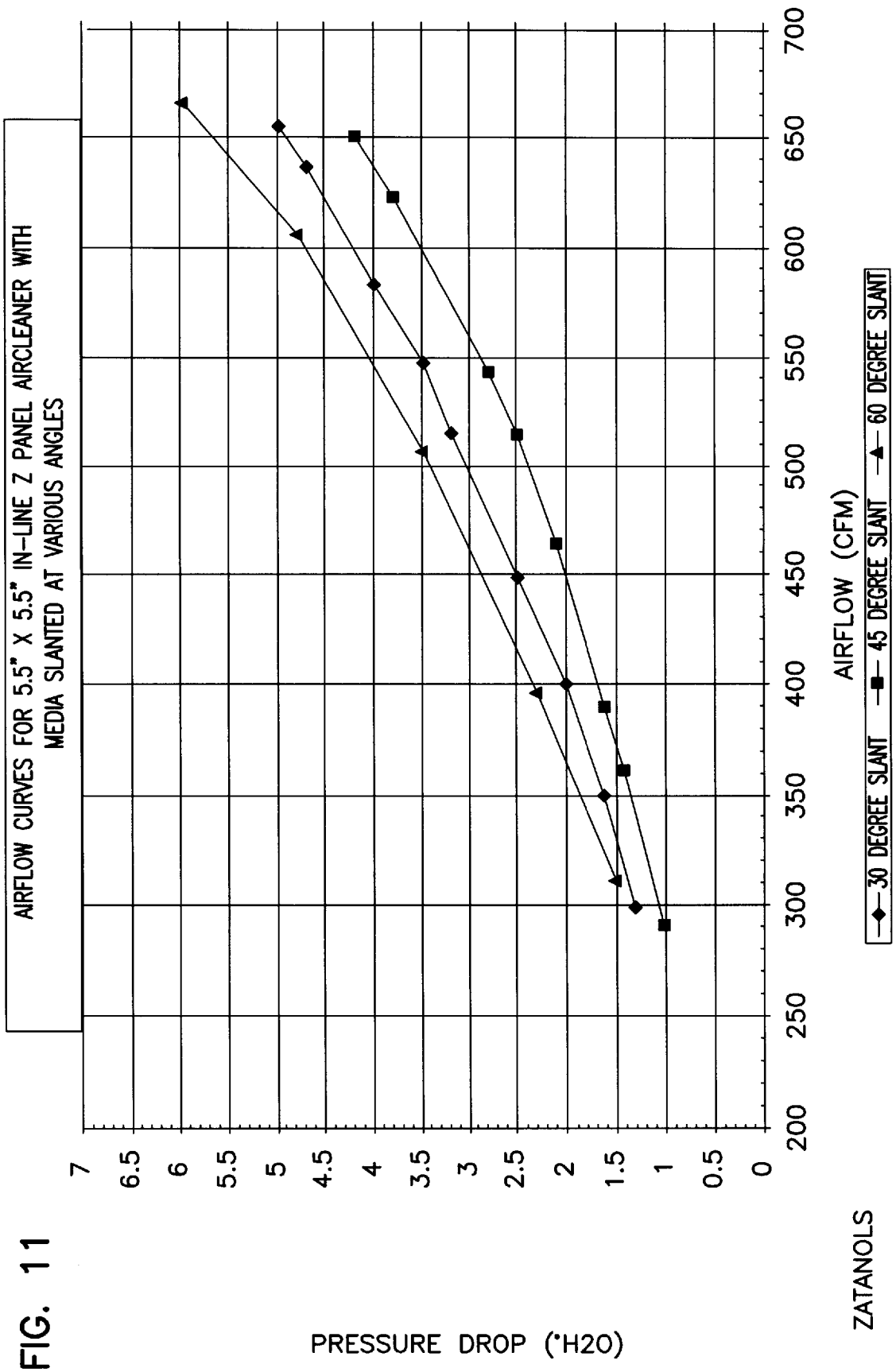

SLANTED INLINE FILTER

BACKGROUND OF THE INVENTION

1. Field of the Invention

The present invention is directed to an inline filter apparatus, and in particular, to an inline filter apparatus which is positioned at a slant relative to the direction of the incoming flow.

2. Prior Art

Filters which insert inline intercepting fluid flow are well known. Such filters provide improved quality of the fluid, but many have design features which limit their effectiveness.

Filters often do not provide adequate filtering area. This leads to a greater pressure drop and earlier clogging of the filter media. Early clogging means a much shorter life and added costs due to filter replacement.

To remedy this situation, it is desirable to increase the filter media area and cross-sectional area of the fluid flow through the filter. However, increased the cross-section of the filtering media area may require a larger diameter filter than the upstream or downstream duct. There may be filtering applications in which this is not an acceptable design alternative. Therefore, it is desirable to have a filter which provides greater filter media area without a substantial flow restriction or an increase in the duct size. In addition, it can be appreciated that the flow through the filter should not provide for drastic flow directional changes, as these changes in direction increase the pressure across the filter which may damage other elements of the system or leads to increased turbulence which may decrease filtering efficiency.

A prior art patent which attempts to overcome these problems is shown in U.S. Pat. No. 2,019,186 to Kaiser. Although the Kaiser patent shows a relatively dense filtering media which can be place inline, it must be dipped in oil or other substance which cause particulate to adhere to the filter material. U.S. Pat. No. 4,728,426 to Rüdinger et al. shows a filter pack with a corrugated spacer. However, the flutes are not closed so that the fluid passes along, rather than through the filtering media.

It can be seen then that a new and improved filtering apparatus is needed which provides increased efficiency without additional cost. In addition, such a filter should be easily installed inline in a duct or other chamber. Such a filter should provide a filter media area in a small space without a large pressure drop across the filter. Moreover, such a filter should not greatly change the direction of the fluid which is being filtered. The present invention addresses these as well as other problems associated with filter devices.

SUMMARY OF THE INVENTION

The present direction is directed to an inline filtering apparatus, and in particular to a filter apparatus having fluted filter media placed at a slant relative to the upstream flow direction.

According to the present invention, a filter apparatus is placed inline in a duct or other flow passage. A filter element is placed across the flow to intercept the unfiltered fluid. The element is formed of a stack of fluted filter media layers which slants across the flow direction, rather than intercepting it perpendicularly. In a preferred embodiment, adjacent filter media layers are offset from one another to provide an improved flow receiving profile. In addition, this configuration decreases the change of direction of the flow, thereby decreasing the pressure differential across the filter.

In addition to being slanted across the flow direction, the leading edge of the filter stack has a fanned out configuration. In this manner the flow is intercepted in a manner which decreases the turbulence and improves flow distribution across the upstream face of the filter.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views:

FIG. 2A–2B show diagrammatic views of the process of manufacturing the filter media shown in FIG. 1;

FIG. 3 shows a perspective view of the fluted filter media layered in a block configuration according to the principles of the present invention;

FIG. 4 shows a detail perspective view of a layer of single-faced filter media for the filter element shown in FIG. 3;

DETAILED DESCRIPTION OF THE PREFERRED EMBODIMENT

Figure 1:
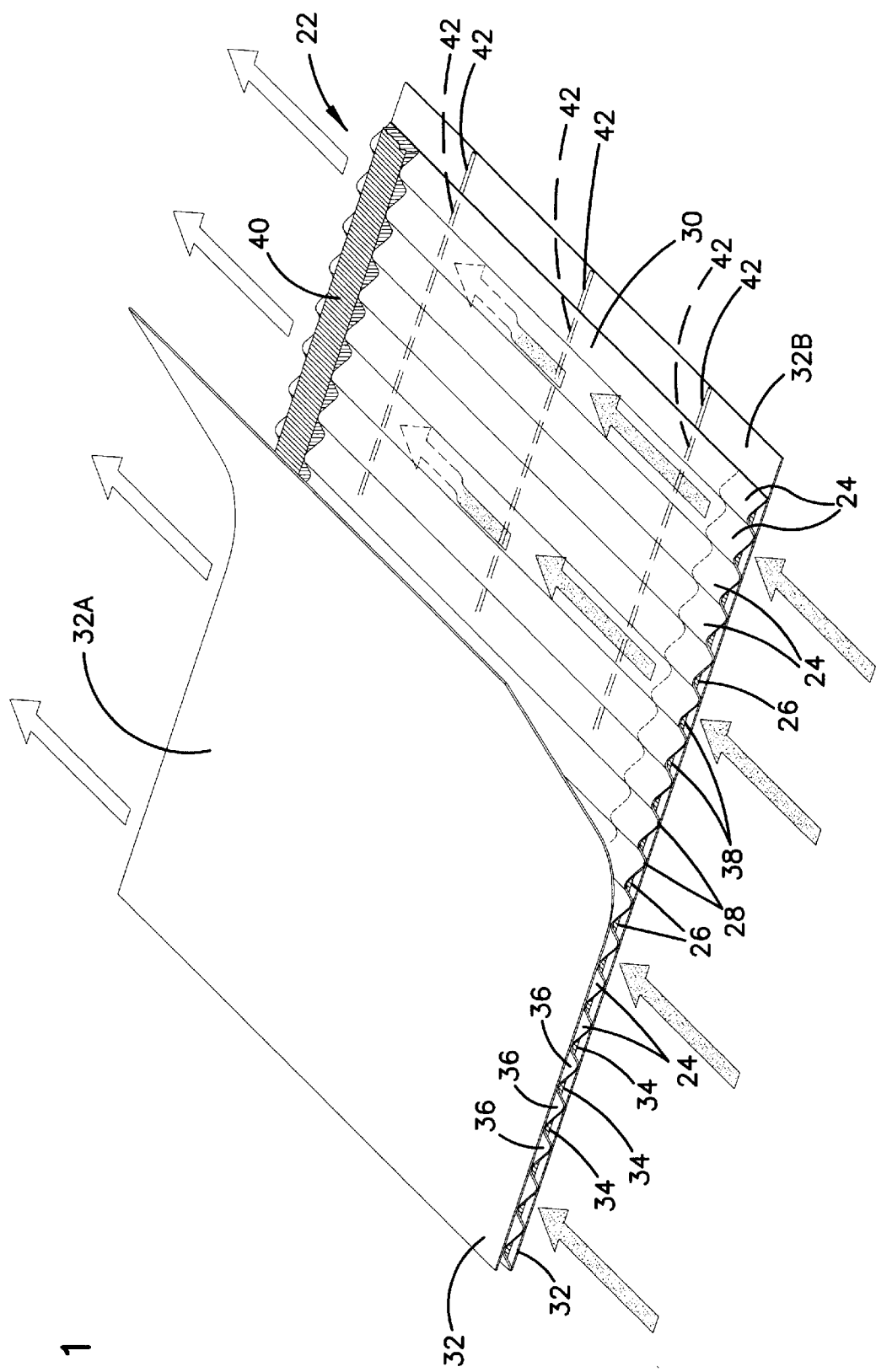
FIG. 1 shows a perspective view of double-faced fluted filter media for the filter apparatus according to the principles of the present invention.

Referring now to the drawings, and in particular to FIG. 1, there is shown a portion of a layer of double-faced permeable fluted filter media, generally designated 22. The fluted filter media 22 includes a multiplicity of flutes 24 which form a corrugated-type material. The flute chambers 24 are formed by a center fluting sheet 30 forming alternating peaks 26 and troughs 28 mounting between facing sheets 32, including a first facing sheet 32A and a second facing sheet 32B. The troughs 28 and peaks 26 peak divide the flutes into an upper row and lower row. In the configuration shown in FIG. 1, the upper flutes form flute chambers 36 closed at the downstream end, while upstream closed end flutes 34 are the lower row of flute chambers. The fluted chambers 34 are closed by first end bead 38 filling a portion of the upstream end of the flute between the fluting sheet 30 and the second facing sheet 32B. Similarly, a second end bead 40 closes the downstream end 36 of alternating flues 24. Adhesive tacks connect the peaks 26 and troughs 28 of the flutes 24 to the facing sheets 32A and 32B. The flutes 24 and end beads 38 and 40 provide a filter element which is structurally self-supporting without a housing.

When filtering, unfiltered fluid enters the flute chambers 36 which have their upstream ends open as indicated by the shaded arrows. Upon entering the flute chambers 36, the unfiltered fluid flow is closed off by the second end bead 40. Therefore, the fluid is forced to proceed through the fluting sheet 30 or face sheets 32. As the unfiltered fluid passes through the fluting sheet 30 or face sheets 32, the fluid is filtered through the filter media layers, as indicated by the unshaded arrow. The fluid is then free to pass through the flute chambers 34, which have their upstream end closed and to flow out the downstream end out the filter media 22. With the configuration shown, the unfiltered fluid can filter through the fluted sheet 30, the upper facing sheet 32A or lower facing sheet 32B, and into a flute chamber 34 blocked on its upstream side.

Referring now to FIGS. 2A–2B, the manufacturing process for fluted filter media which may be stacked to form filter elements, as explained hereinafter, is shown. It can be appreciated that when the filter media is layered, with adjacent layers contacting one another, only one facing sheet 32 is required as it can serve as the top for one fluted layer and the bottom sheet for another fluted layer. Therefore, it can be appreciated that the fluted sheet 30 need be applied to only one facing sheet 32.

As shown in FIG. 2A, a first filtering media sheet 30 is delivered from a series of rollers to opposed crimping rollers 44 forming a nip. The rollers 44 have intermeshing wavy surfaces to crimp the first sheet 30 as it is pinched between the rollers 44. As shown in FIG. 2B, the first now corrugated sheet 30, and a second flat sheet of filter media 32 are fed together to a second nip formed between one of the crimping rollers 44 and an opposed roller 45. A sealant applicator 47 applies a sealant 46 along the upper surface of the second sheet 32 prior to engagement between the crimping roller 44 and the opposed roller 45. At the beginning of a manufacturing run, as the first sheet 30 and second sheet 32 pass through the rollers 44 and 45, the sheets fall away. However as sealant 46 is applied, the sealant 46 forms first end bead 38 between the fluted sheet 30 and the facing sheet 32. The troughs 28 have tacking beads 42 applied at spaced intervals along their apex or are otherwise attached to the facing sheet 32 to form flute chambers 34. The resultant structure of the facing sheet 32 sealed at one edge to the fluted sheet 30 is single-faced layerable filter media 48, shown in FIG. 4.

Referring now to FIG. 3, it can be appreciated that the filter media layer 48 having a single backing sheet 32 and a single end bead 38 can be layered to form a block-type filter element, generally designated 50. It can be appreciated that a second bead 40 is laid down on an opposite edge outside of the flutes so that adjacent layers 48 can be added to the block 50. In this manner, first end beads 38 are laid down between the top of the facing sheet and the bottom of the fluted sheet 30, as shown in FIG. 4, while the space between the top of the fluted sheet 30 and the bottom of the facing sheet 32 receives a second bead 40. In addition, the peaks 26 are sealed to the bottom of the facing sheet 32 to form closed flutes 36. In this manner, a block of fluted filter media 50 is achieved utilizing the fluted layers 48 shown in FIG. 4. The filter element 50 includes adjacent flutes having alternating first closed ends and second closed ends to provide for substantially straight-through flow of the fluid between the upstream flow and the downstream flow.

Figure 5:
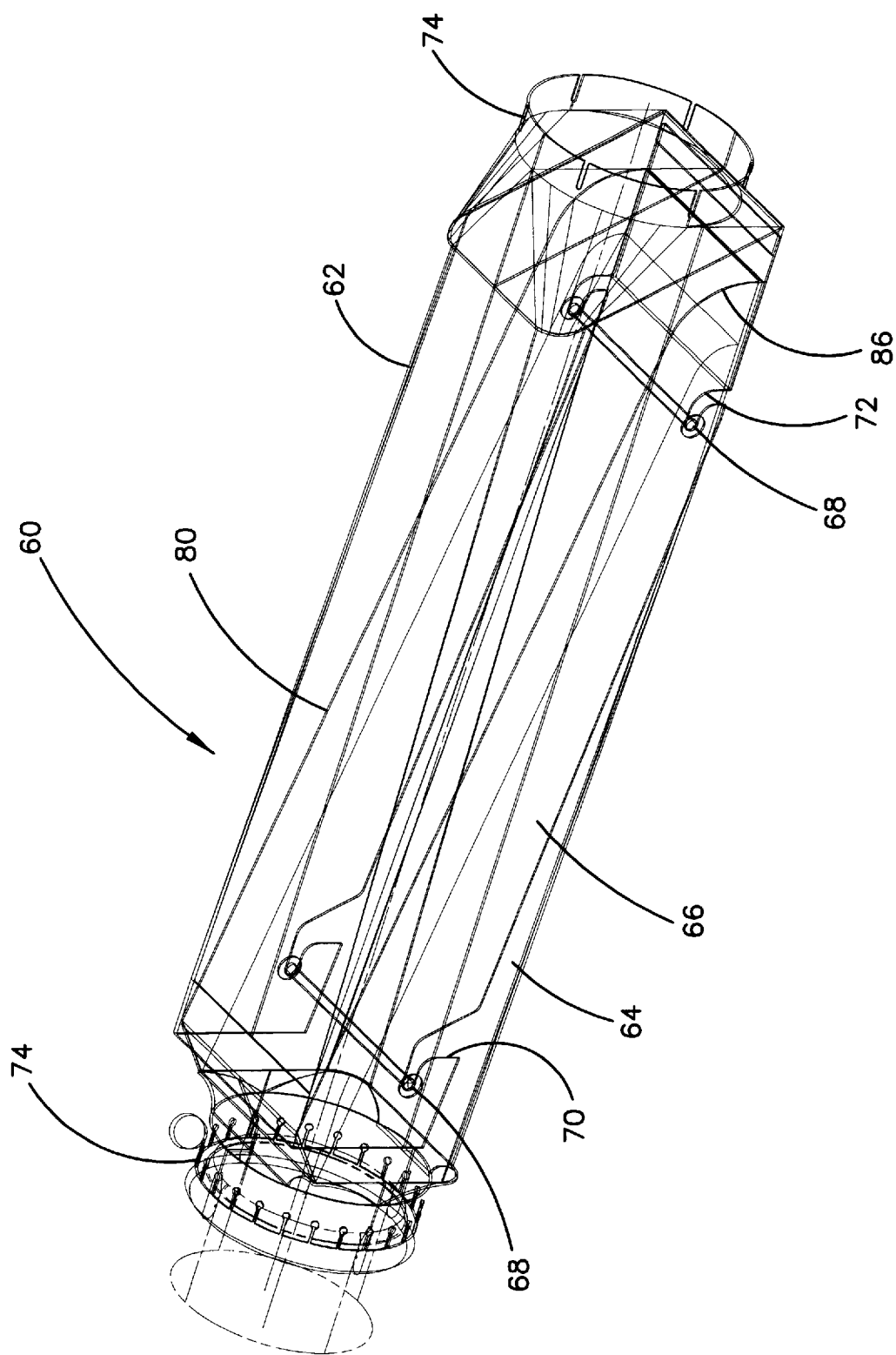
FIG. 5 shows a perspective view of an angled inline filter having the fluted filter media shown in FIG. 1 according to the principles of the present invention.

Referring now to FIG. 5, there is shown a first embodiment of a slanted inline filter apparatus, generally designated 60. In the embodiment shown, the filter apparatus 60 includes an elongated rectangular housing 62 including an upper section 64 and a lower section 66 forming an enlarged portion inline in the duct. The two sections connect together by sliding the housing sections 64 and 66 relative to one another with pins 68 on the lower section 66 engaging slots 70 and 72 on the upper section. In this manner, lower housing section 66 slides inside of the upper housing section 64 so that the housing sections 64 and 66 can easily be taken apart and reassembled for changing a filter element. The housing 62 shown is configured for fitting onto a round duct extending both upstream and downstream from the filter and includes rounded end portions 74 adapted for attaching and sealing to the upstream and downstream portions of the duct. The ends of the housing 62 are preferably clamped to the duct at the upstream and downstream ends. In the embodiment shown, the upper housing section 64 remains in place, while the lower housing section 66 is removed for changing or replacing the filter element, as explained hereinafter.

Figure 6:
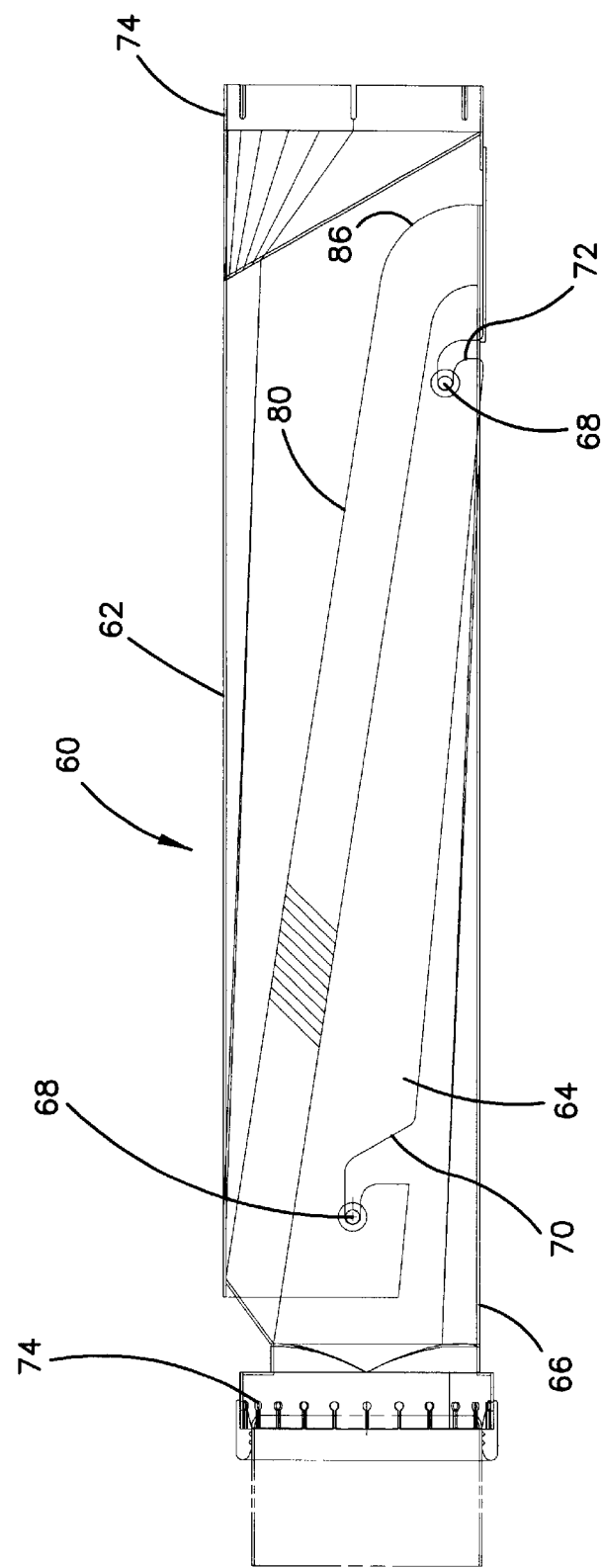
FIG. 6 shows a side elevational view of the angled inline filter element shown in FIG. 5.

As shown more clearly in FIG. 6 within the filter housing 62 and extending diagonally through the prevailing flow is a filter element 80. The filter element 80 has a stack of individual fluted filter layers 88 in a stacked configuration. The individual fluted filter element layers 88 extend with the leading edge 82 intercepting the flow and a downstream edge 84 exiting the flow. With this configuration, the fluted filter element 80 intercepts the flow over a much greater area than a perpendicularly extending filter having an area approximately equal to the cross sectional area of the flow through the duct. A sleeve 76 extends on either side and beneath the stack to provide additional support and shape to the filter element 80. The stack is sealed to the lower housing section 66, which can be removed from the upper housing section 64. To remove and replace the filter element 80, the lower housing section 66, including the filter element 80 is slid from the upper housing section 64 and a new lower housing section 66 having a clean filter element 80 is inserted.

Figure 7:
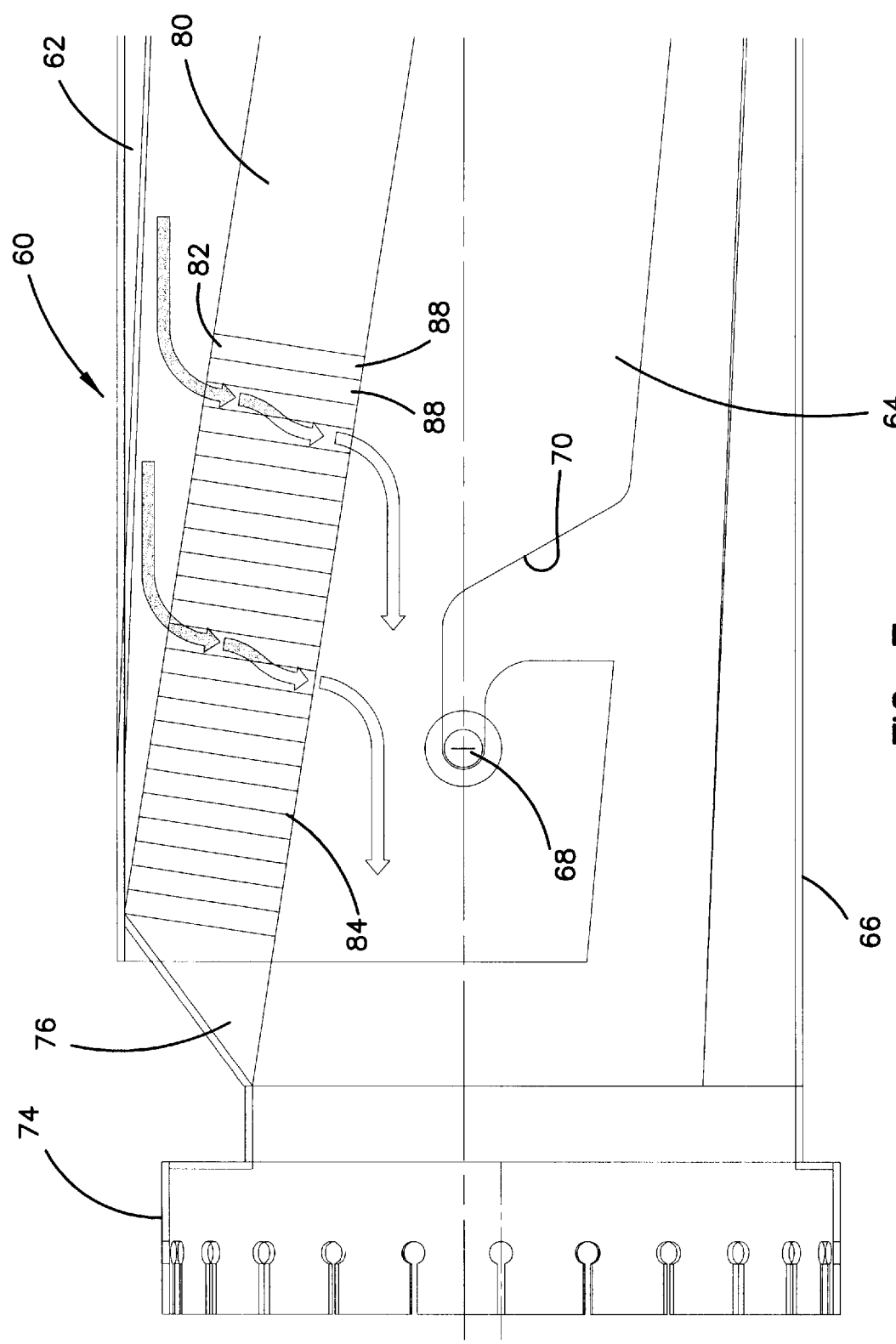
FIG. 7 shows a side detail view of a first embodiment of slanted filter media elements and fluid flow for the slanted filter apparatus shown in FIG. 5.

As can be appreciated, the fluted filter element layers 88 are stacked against one another, as shown in FIG. 7, forming an enlarged flow receiving face. Upon engaging the upstream face of the filter element 80, the flow changes to direct through the individual flutes in passing from a first flute 36 having an upstream end open, through the filter media and along a flute 34 having a downstream open end. As the fluid passes through the filter media, as shown in FIG. 7 or in detail in FIG. 1, the fluid is filtered and flows through the downstream side of the filter.

Figure 8:
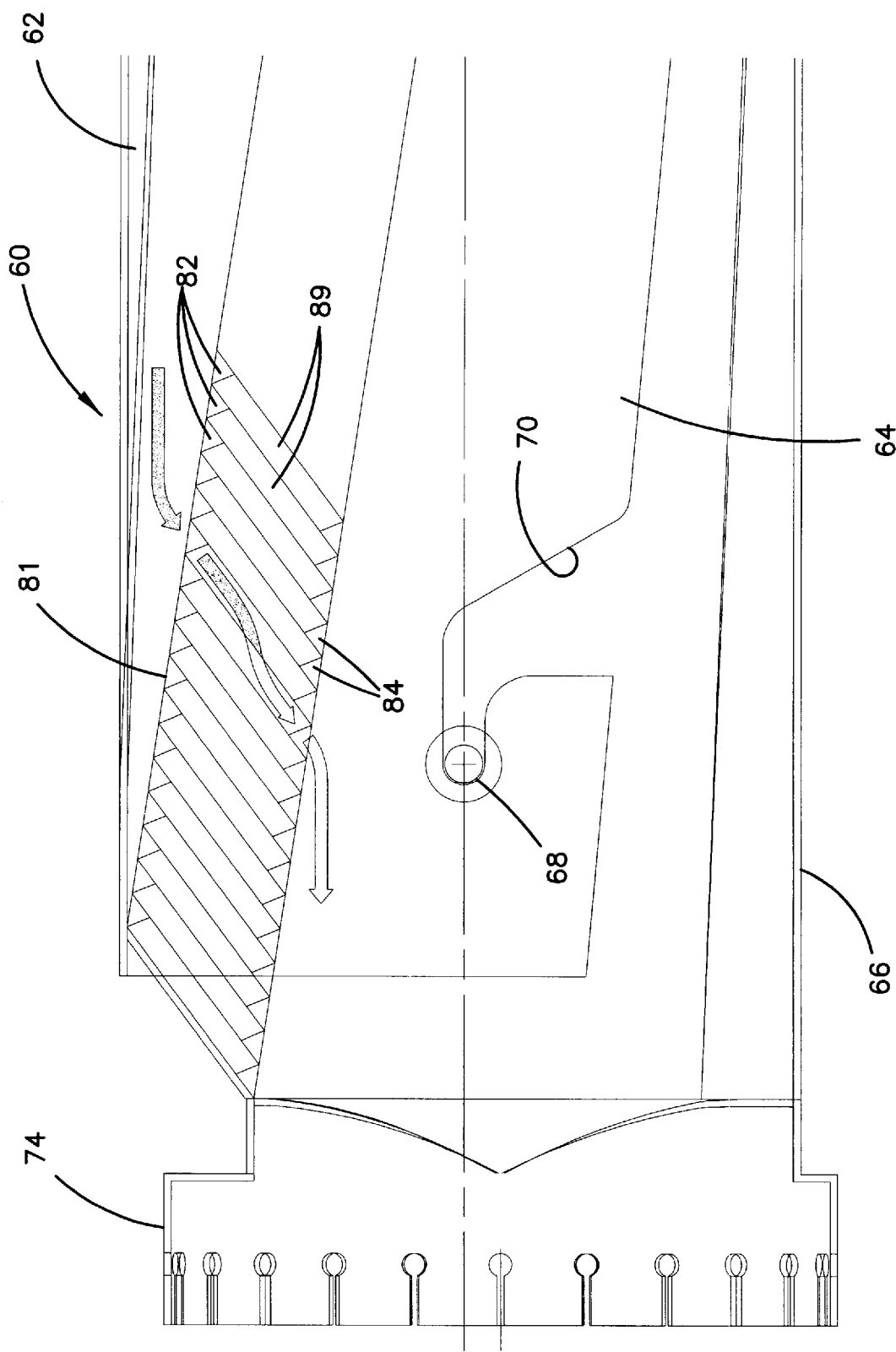
FIG. 8 shows a side detail view of a second embodiment of slanted filter media elements and fluid flow for the slanted filter apparatus shown in FIG. 5.

Referring now to FIG. 8, in a second embodiment of the filtering apparatus, individual fluted filter element layers 89 are slanted relative to the longitudinal direction of filter stack 81 rather than extending perpendicular to the stack. It can be appreciated that with this configuration, the flow passes through the fluted compartments with a decreased change of direction. For the embodiment shown in FIG. 8, the change of direction both passing into the flutes and out of the flutes is decreased. A more abrupt change of direction is shown in the embodiment of FIG. 7. The configuration shown in FIG. 8 provides for a decreased pressure drop across the filter 81. It can also be appreciated that the leading edges 82 of each filter element are offset from adjacent elements 89 for improved reception and distribution of flow into the flutes.

Turning now to FIG. 11, it can be appreciated that the pressure drop across the filter element can be optimized by changing the relative angle of the flutes in the filter layers 89 relative to the prevailing direction of the flow. It has been found that the pressure drop decreases significantly when the longitudinal direction of the flutes at the leading upstream edge 82 of the flutes is between 30° and 60° relative to the prevailing direction of the upstream flow. However, it can be further appreciated that the pressure drop is minimized with the flutes having a relative angle to the upstream flow approaching 45° as shown in FIG. 8. This can be accomplished by changing the angle of the filter element stack 80 and/or angling the fluted filter layers 89 relative to the stack 81. In the embodiment shown, the fluted filter layers 89 extend at approximately a 45° angle relative to the longitudinal direction of the housing 62 and the upstream prevailing direction of the fluid flow.

Figure 9:
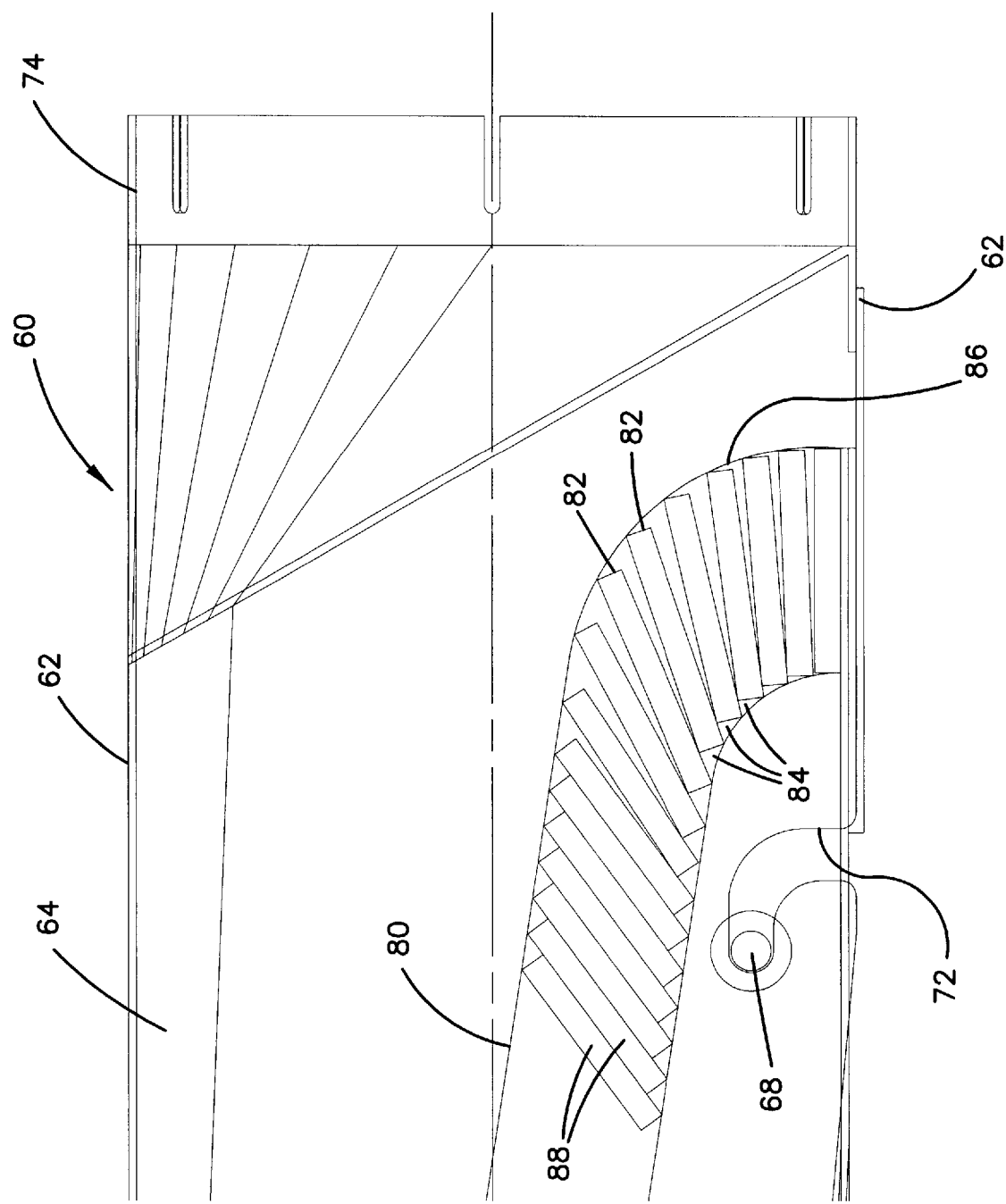
FIG. 9 shows a side elevational detail view of an upstream end of the stack of filter media elements for the slanted filter apparatus shown in FIG. 5.

Referring now to FIG. 9, it has been further found that a leading end portion 86 of the stack 80 provides for better flow and improved filtering if it is curved to engage a wall of the housing 62. In the configuration shown, the leading end 86 is in a fan configuration rounding as the filter stack 80 approaches the housing wall at its leading end. With this configuration, the flute 24 proximate the housing wall extends substantially parallel to the housing wall.

The filter media stack 80 is sealed relative to the trailing edge of the housing 62 so that the downstream edge is sealed, as shown in FIGS. 7–8, so that no leaks occur following filtering of the fluid. The configuration shown provides improved flow and filtering with minimal pressure drop and eliminates leakage.

Figure 10:
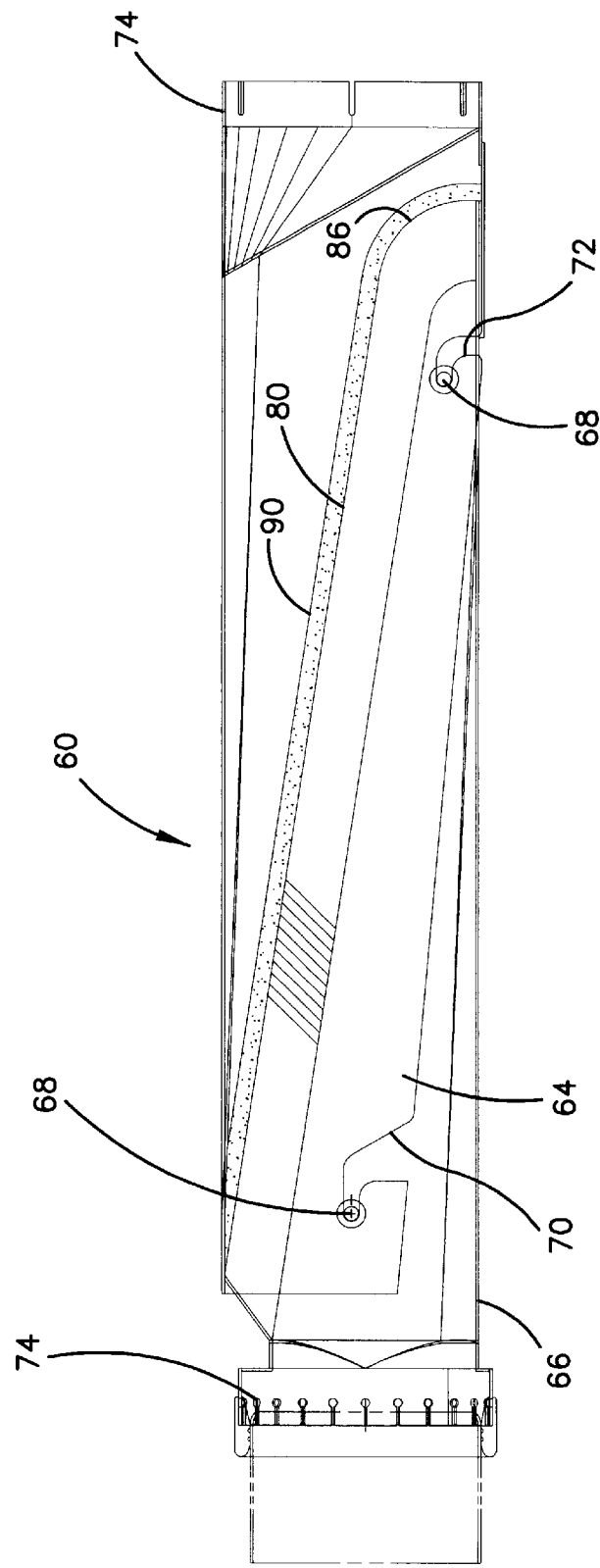
FIG. 10 shows a perspective view of an angled inline filter having the fluted filter media shown in FIG. 1 and prefiltering material according to the principles of the present invention; and, FIG. 11 shows a graph comparing pressure drop across the filter compared to filter media element angle relative to the flow.

As shown in FIG. 10, the filter stack 80 may be preceded by a prefilter 90. In a preferred embodiment, the prefilter 90 is an open material. A product suitable for the prefilter layer 90 is sold under the tradename Airlaid Media by Comulus Fiber Corp. located in Charlotte, N.C. For a thickness of 0.75", the open material has a density of 6.7 ounces/yd$^2$ and a solidity of 0.8%. Another suitable prefilter material having a thickness of 0.25" with a density of 3.62 ounces/yd$^2$ and a solidity of 1.6% is available from Chemwove Corp. in Charlotte, N.C. The prefiltering material 94 removes the larger particles and other contaminants prior to passing through the filter stack 80. In a preferred embodiment, the prefilter layer 90 is attached over the upstream edge of the filter stack 80 and has a thickness of one-fourth the length of the flutes in the filter element 80.

It can be appreciated that the stack 80 or 81 is manufactured in a process similar to that shown in FIGS. 3 and 4 so that facing sheets 32 serve as both the front and back sheets of the two adjacent elements 88 or 89.

It can be appreciated that with the present invention, the filter apparatus provides for high efficiency filtering with minimal pressure drop and with minimal additional space needed to accommodate the filter. The filter element inserts directly in-line through the flow in a duct or other member. Moreover, the filter media face intercepting the flow is greatly increased relative to the size of the duct. The amount of filter media area is also greatly increased with a greater number of fluted elements intercepting the flow. The slant also provides for distributing the flow more evenly across the filter so that there is less localized loading, providing for greater filter life than other filtering elements. It can also be appreciated that to achieve the same filter efficiency a comparable pressure drop and flow, much larger filters would be required. This is not possible with prior filter designs, which require enlarged filter media and larger diameter duct.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A filter device having a duct with flow passing along a direction from upstream to downstream, the filter device comprising a plurality of planar filter media layers arranged in a stack within the duct, wherein each of the layers includes a plurality of substantially parallel flutes and flutes of adjacent layers have substantially parallel flutes; wherein the stack of filter media layers is inclined at an oblique angle relative to the direction of the flow.

2. A filter device according to claim 1, wherein the fluted filter media layers include a leading face receiving the flow and wherein filter media layers are selectively arranged with the leading faces spaced apart from the leading faces of adjacent filter media layers.

3. A filter device according to claim 2, wherein the filter media layers extend at an angle between about 30 degrees and 60 degrees relative to the longitudinal direction of the upstream flow.

4. A filter device according to claim 1, wherein adjacent filter media layers are attached.

5. A filter device according to claim 1, wherein the stack of filter media layers extends across the entire cross sectional area of the duct.

6. A filter device according to claim 5, wherein the stack of filter media layers engages the duct such that a seal is formed between the duct and the stack of filter media layers.

7. A filter device according to claim 5, wherein the duct comprises housing having a rectangular cross-section.

8. A filter device according to claim 1, wherein the fluted filter media layers include a first layer having a leading face receiving the flow and a second layer having a leading face receiving the flow, and wherein the leading face of the first layer is offset from the leading face of the second layer.

9. A filtering device according to claim 1, wherein the filter media layers are stacked relative to the one another with an upstream face of each filter media layer extending beyond an adjacent face of a downstream filter media layer.

10. A filtering device according to claim 1, further comprising a prefiltering filter upstream of the stack of filter media layers.

11. A filtering device according to claim 1, wherein an upstream end of the stack of filter media layers is configured so that the upstream edge of the stack curves toward a wall of the duct.

12. A filtering device according to claim 11, wherein the filter media layers are configured such that the layers fan out as the stack curves toward the wall of the duct.

13. A filtering device according to claim 1, further comprising a seal between the stack and the housing on the downstream side of the filter layers.

14. A filtering device according to claim 1, wherein the filter media layers comprise structurally self-supporting fluted filter layers.

15. A filtering device according to claim 14, wherein the fluted filter layers comprise a plurality of flutes forming flute chambers, and wherein the flute chambers are closed on alternating ends.

16. A filter device according to claim 1, further comprising a supporting sheet covering sides of the stack of filter media layers.

17. A filter device according to claim 1, wherein the longitudinal direction of the filter media layers is oblique to the longitudinal direction of the stack.

18. A filter device according to claim 1, wherein the longitudinal direction of the filter media layers is oblique to the longitudinal direction of the stack.

19. A filter device according to claim 1, wherein each of the planar filter media layers is recessed relative to upstream planar filter media layers.

20. A filter device according to claim 1, wherein each of the planar filter media layers is inclined at a second oblique angle relative to the direction of the flow, and wherein the second oblique angle is different from the oblique angle of the stack relative to the direction of the flow.

21. A filter device having flow passing from upstream to downstream through the filter device, comprising:
  a plurality of planar fluted filter media elements including a plurality of stacked substantially parallel flutes;
  wherein the stack includes an upstream face inclined relative to the direction of the upstream flow;
  wherein the fluted filter media elements include a leading upstream face receiving the flow and wherein filter media elements are selectively arranged with the leading upstream faces recessed from upstream faces of adjacent filter media elements.

22. A filtering device according to claim 21, wherein the flutes of the filter media elements extend at an angle of between 30 degrees and 60 degrees relative to the direction of the upstream flow.

23. A filtering device according to claim 21, wherein the filter media elements are stacked relative to one another with an upstream edge of each filter media element extending beyond the adjacent downstream filter media element.

24. A filtering device according to claim 21, further comprising a prefiltering filter upstream of the stack of filter media elements.

25. A filtering device according to claim 21, wherein an upstream end of the stack of filter media elements is curved so that flutes nearest a wall of the duct extend substantially parallel to the wall.

26. A filtering device according to claim 25, wherein the filter media layers fan out as the stack curve.

27. A filter device according to claim 21, wherein flutes in adjacent filter media elements are parallel.

28. A filter device having a housing with flow passing from upstream to downstream through the filter device, comprising a plurality of planar fluted filter media layers including a plurality of substantially parallel flutes stacked within the housing with upstream faces of adjacent media layers being spaced apart; wherein the stack of filter media layers is inclined relative to the direction of the flow, and wherein the housing comprises a first section and a second section and wherein the stack of filter media layers attaches to the first housing section and wherein the firs housing section is removably attached to the second housing section.

29. A filter device having a duct with flow passing from upstream to downstream, the filter device comprising a plurality of planar filter media layers arranged in a stack within the duct, wherein each of the layers includes a plurality of substantially parallel flutes; wherein the stack of filter media layers is inclined relative to the direction of the flow and wherein an upstream end of the stack of filter media layers is configured so that the upstream edge of the stack curves toward a wall of the duct.

30. A filter device having flow passing from upstream to downstream through the filter device, comprising:
  a housing;
  a plurality of planar fluted filter media elements including a plurality of stacked substantially parallel flutes within the housing;
  wherein the stack includes an upstream face inclined relative to the direction of the upstream flow;
  wherein the fluted filter media elements include a leading edge receiving the flow and wherein filter media elements are selectively arranged with the leading edges offset from adjacent filter media elements; and
  wherein an upstream end of the stack of filter media elements is curved so that flutes nearest a wall of the housing extend substantially parallel to the wall.

* * * * *